March 7, 1967  M. F. M. BRUYERE  3,307,395
DEVICE FOR MEASURING THE THRUST OF A GASEOUS JET
Filed July 13, 1964

United States Patent Office 3,307,395
Patented Mar. 7, 1967

3,307,395
DEVICE FOR MEASURING THE THRUST
OF A GASEOUS JET
Marcel François Martin Bruyere, Bois-Colombes, France,
assignor to Societe d'Exploitation des Materiels Hispano-Suiza, Bois-Colombes, France
Filed July 13, 1964, Ser. No. 382,287
Claims priority, application France, July 29, 1963,
943,036
4 Claims. (Cl. 73—141)

The present invention relates to devices for measuring the thrust of a gaseous jet flowing out from a nozzle belonging to an air or space machine. The invention is more especially but not exclusively concerned with devices for measuring the thrust of a gaseous jet, in particular an air jet, flowing out from a stabilizing and/or piloting nozzle mounted on a vertical take off and landing aircraft.

The chief object of the present invention is to provide a device of the above mentioned kind which is particularly simple and easy to utilize.

According to the present invention the device comprises a supporting carriage or the like capable of being brought opposite the jet to be measured and arranged in such manner as to absorb practically the whole kinetic energy of said jet before permitting evacuation of the stream of gas forming the jet, preferably in a direction perpendicular to the axis of said jet, said absorbing device cooperating with dynamometric means for measuring the force tending to push off the energy absorbing means, said force corresponding to the thrust of the jet.

Preferred embodiments of the present invention will be hereinafter described with reference to the appended drawings, given merely by way of example, and in which.

Figure 1:
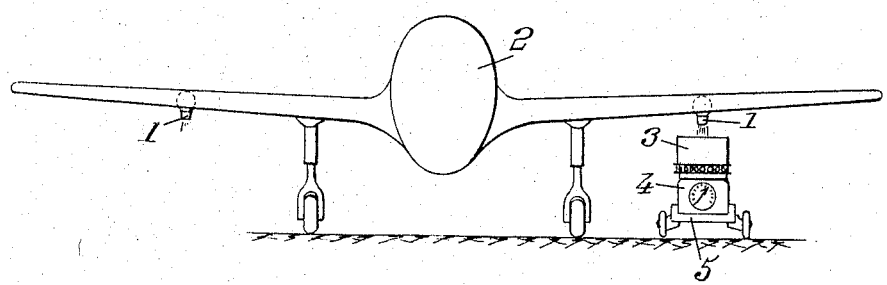
FIG. 1 is a front view of a vertical take off and landing aircraft provided with stabilizing nozzles, an apparatus according to the present invention being disposed under one of said nozzles for measuring the thrust of the jet issuing therefrom.
Figure 2:
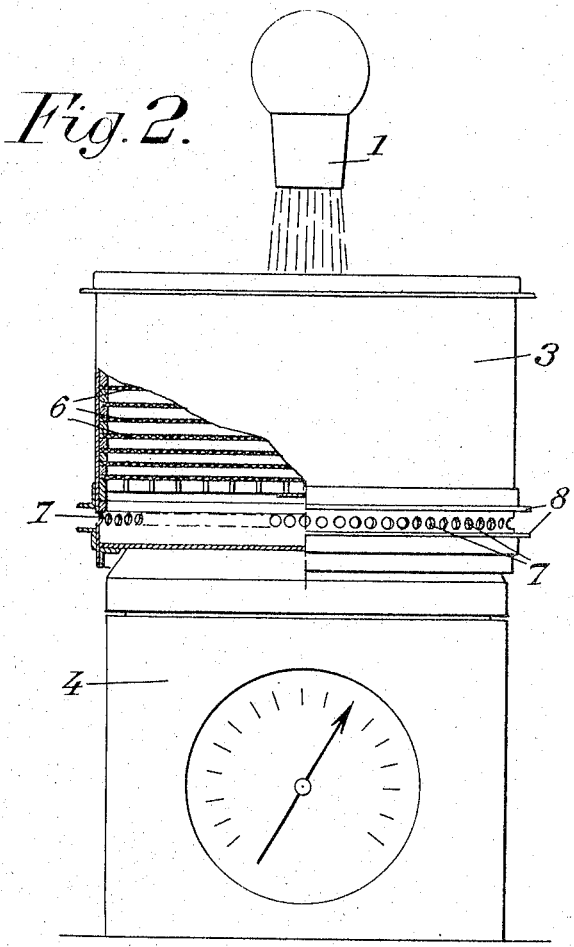
FIG. 2 shows, on an enlarged scale, the device according to the present invention, in elevational view with parts cut away.

In the following description of an embodiment of the invention it will be supposed that the device according to this invention is used to measure the thrust of gaseous jets issuing from stabilization and/or piloting nozzles 1 disposed under the wings of an aircraft 2 of the vertical take off and landing type, said nozzles being fed for instance with air supplied by a power plant mounted on the aircraft.

It is known that, when taking off or landing, the pilot controls the stability of the aircraft by varying, if necessary, the respective thrust supplied by nozzles 1.

It is of course necessary to check up the good operation of the circuit for supplying said nozzles with fluid under pressure.

This verification should of course belong to the check up to be effected before the aircraft takes off.

Now in view of the great number of elements cooperating in the feed of stabilizing nozzles, it is practically impossible to check up said elements separately.

The essential feature of the present invention is to permit of checking up on the spot, in a simple and quick manner, the operation of stabilizing nozzles 1 and of the means for feeding them with fluid.

According to the present invention, the checking device comprises energy absorbing means 3 movable so as to be brought opposite every nozzle 1 to be checked up and arranged in such manner as to absorb substantially the whole of the kinetic energy available in the jet supplied from the nozzle, the stream of gas forming the jet being of course evacuated, preferably in a direction perpendicular to the axis of the jet, so as to produce no component in the direction of the axis of thrust of the nozzle, the energy absorbing means 3 cooperating with a dynamometric apparatus 4 capable of measuring the force tending to push back the energy absorbing means, which force is of course equal to the thrust of the jet.

The energy absorbing device 3 and the dynamometric apparatus 4 are supported by a carriage 5 so that they can be brought under any nozzle to be checked up.

The energy absorbing device 3 may consist, as illustrated by FIG. 1, of a cylindrical container open at its upper end, located opposite nozzle 1 and fitted with a plurality of superposed parallel screens 6. The meshes of said screens, located for instance at one centimeter from one another, are preferably disposed in staggered relationship from one screen to the next one. The residual gas stream flows out at the lower end of the container through a multiplicity of outlets 7 provided in the side wall of said container and disposed symmetrically with respect to the axis thereof.

Outlet orifices 6 are located between two flanges 8 in order to avoid any interference between the residual stream that is evacuated and the support of the device, which interferences might disturb the measurement.

Figure 3:
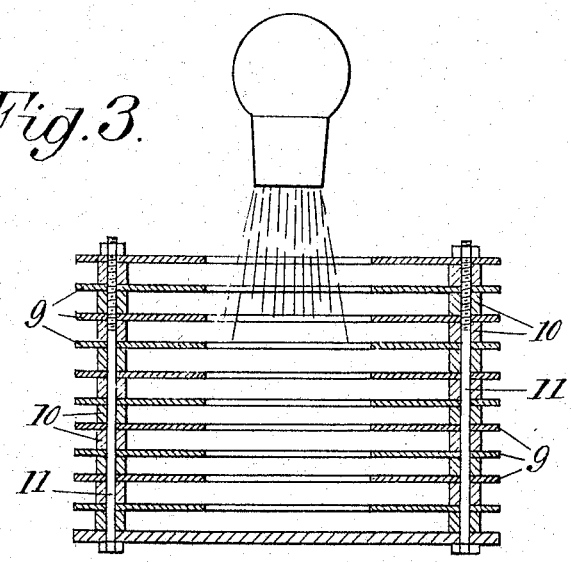
FIG. 3 is an axial sectional view of a portion of the device made according to another embodiment of the invention.
Figure 4:
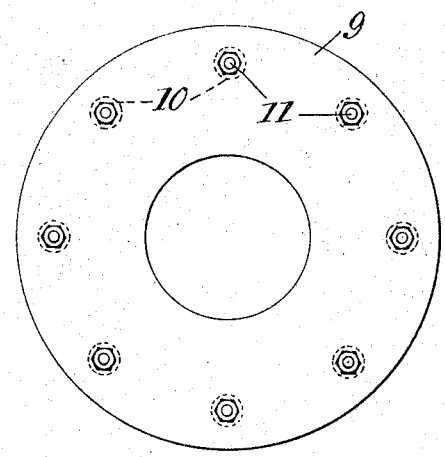
FIG. 4 is a plan view corresponding to FIG. 3.

In the embodiment of FIGS. 3 and 4 the energy absorbing means consist of a plurality of metallic circular discs 9 disposed parallelly at a distance from each other and carried by rods 11 provided with spacers 10. Absorption of the energy of the gaseous jet takes place in the central passage and the residual stream flows out through the spaces between the successive discs.

Of course if the gaseous jet the energy of which is to be measured, was directed not downwardly but in another direction, for instance upwardly or obliquely, it would be necessary to mount the energy absorbing means in such manner as to have the inlet thereof located opposite the gaseous jet, the dynamometric apparatus measuring the force applied by the jet to said energy absorbing means.

The dynamometric apparatus 4 may be of a type, for instance if it is of an electric nature, operable from a distance and in this case it might be carried in fixed position on carriage 5, the energy absorbing means being mounted on an articulated system for bringing it opposite nozzles of various directions.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A device for measuring the thrust of a gaseous jet having a given direction which comprises, in combination, a container having an inlet for receiving said gaseous jet, means in said container fixed with respect thereto and adapted to be struck by said jet for imparting to said container practically the whole of the kinetic energy of the gaseous stream forming said jet admitted through said inlet, said container being provided with lateral outlets for the outflow of said gaseous stream in a direction transverse to that of said jet and means for measuring the energy given off by said jet to said container.

2. A device for measuring the thrust of a gaseous jet having a given direction which comprises, in combination, a container having an inlet for receiving said gaseous jet, a multiplicity of screens carried in fixed position by said container transversely to the direction of inflow of said gaseous jet thereinto for absorbing practically the whole of the kinetic energy of the gaseous stream forming said jet admitted through said inlet, said container being provided, in the side wall thereof and at its end opposed to said inlet, with a row of outlet holes for the outflow of said gaseous stream after it has transmited its kinetic energy to said screens, and means for measuring the enrgy given off by said jet to said container.

3. A device according to claim 2 further comprising two flanges carried by the side wall of said container on the outer side of said wall, said flanges being located above and below said row of outlet holes.

4. A device for measuring the thrust of a gaseous jet having a given direction which comprises, in combination, a container having an inlet for receiving said gaseous jet, a multiplicity of parallel annular discs carried in fixed position by said container at a distance from one another for absorbing practically the whole of the kinetic energy of the gaseous stream forming said jet admitted through said inlet, the inlet of said container being located opposite the central openings of said discs, the side walls of said container being provided with outlet orifices for the outflow of said gaseous stream after it has transmitted its kinetic energy to said discs, and means for measuring the energy given off by said jet to said container.

References Cited by the Examiner
UNITED STATES PATENTS

| 315,261 | 4/1885 | Edwards | 73—189 |
| 3,218,854 | 11/1965 | Brown | 73—228 |

OTHER REFERENCES

Doolittle et al.: "Fluid Flow Measuring Device," IBM Technical Disclosure Bulletin, volume 1, No. 5, February, 1959, page 10.

RICHARD C. QUEISSER, *Primary Examiner.*

C. A. RUEHL, *Assistant Examiner.*